US006780814B2

(12) United States Patent
Ma et al.

(10) Patent No.: US 6,780,814 B2
(45) Date of Patent: Aug. 24, 2004

(54) MULTIMETALLIC REFORMING CATALYST COMPRISING PLATINUM AND TIN, THE PREPARATION AND THE APPLICATION THEREOF

(75) Inventors: Aizeng Ma, Beijing (CN); Jincheng Pan, Beijing (CN); Sennian Yang, Beijing (CN)

(73) Assignees: China Petroleum & Chemical Corporation, Beijing (CN); Research Institute of Petroleum Processing, Sinopec, Beijing (CN)

(*) Notice: Subject to any disclaimer, the term of this patent is extended or adjusted under 35 U.S.C. 154(b) by 0 days.

(21) Appl. No.: 10/132,910

(22) Filed: Apr. 26, 2002

(65) Prior Publication Data

US 2004/0011702 A1 Jan. 22, 2004

(30) Foreign Application Priority Data

Apr. 28, 2001 (CN) .......................................... 01115617 A

(51) Int. Cl.$^7$ .......................... B01J 27/06; B01J 27/135; B01J 27/128; B01J 23/00; B01J 23/42
(52) U.S. Cl. ........................ 502/224; 502/227; 502/229; 502/302; 502/334; 502/339; 502/349
(58) Field of Search ................................ 502/224, 227, 502/302, 334, 339, 349, 229

(56) References Cited

U.S. PATENT DOCUMENTS

| | | | | |
|---|---|---|---|---|
| 3,852,190 A | * | 12/1974 | Buss et al. | 208/138 |
| 3,915,845 A | | 10/1975 | Antos | 208/139 |
| 4,003,826 A | | 1/1977 | Antos | 208/139 |
| 4,039,477 A | | 8/1977 | Engelhard et al. | 252/441 |
| 5,254,518 A | | 10/1993 | Soled et al. | 502/241 |
| 5,258,567 A | | 11/1993 | Kerby et al. | 585/654 |
| 5,665,223 A | * | 9/1997 | Bogdan | 208/138 |
| 6,013,173 A | | 1/2000 | Bogdan | 208/139 |
| 6,059,960 A | | 5/2000 | Bogdan | 208/139 |
| 6,495,487 B1 | * | 12/2002 | Bogdan | 502/227 |
| 2002/0155946 A1 | * | 10/2002 | Bogdan et al. | 502/227 |

FOREIGN PATENT DOCUMENTS

CN 1210880 A 3/1999

* cited by examiner

Primary Examiner—Mark L. Bell
Assistant Examiner—Patricia L. Hailey
(74) Attorney, Agent, or Firm—Greenblum & Bernstein P.L.C.

(57) ABSTRACT

A multimetallic reforming catalyst and the preparation process thereof are disclosed. Said catalyst comprises the following components on the basis of mass percent: 0.01–2.0 of a Group VIII metal, 0.01–5.0 of a Group IVA metal, 0.01–10.0 of Eu, 0.01–10.0 of Ce, 0.10–10.0 of a halogen, and 63.00–99.86 of a refractory inorganic oxide. This catalyst has relatively high activity and selectivity, low carbon deposition rate and long lifetime for reformation of naphthas.

11 Claims, 6 Drawing Sheets

Figure 1:
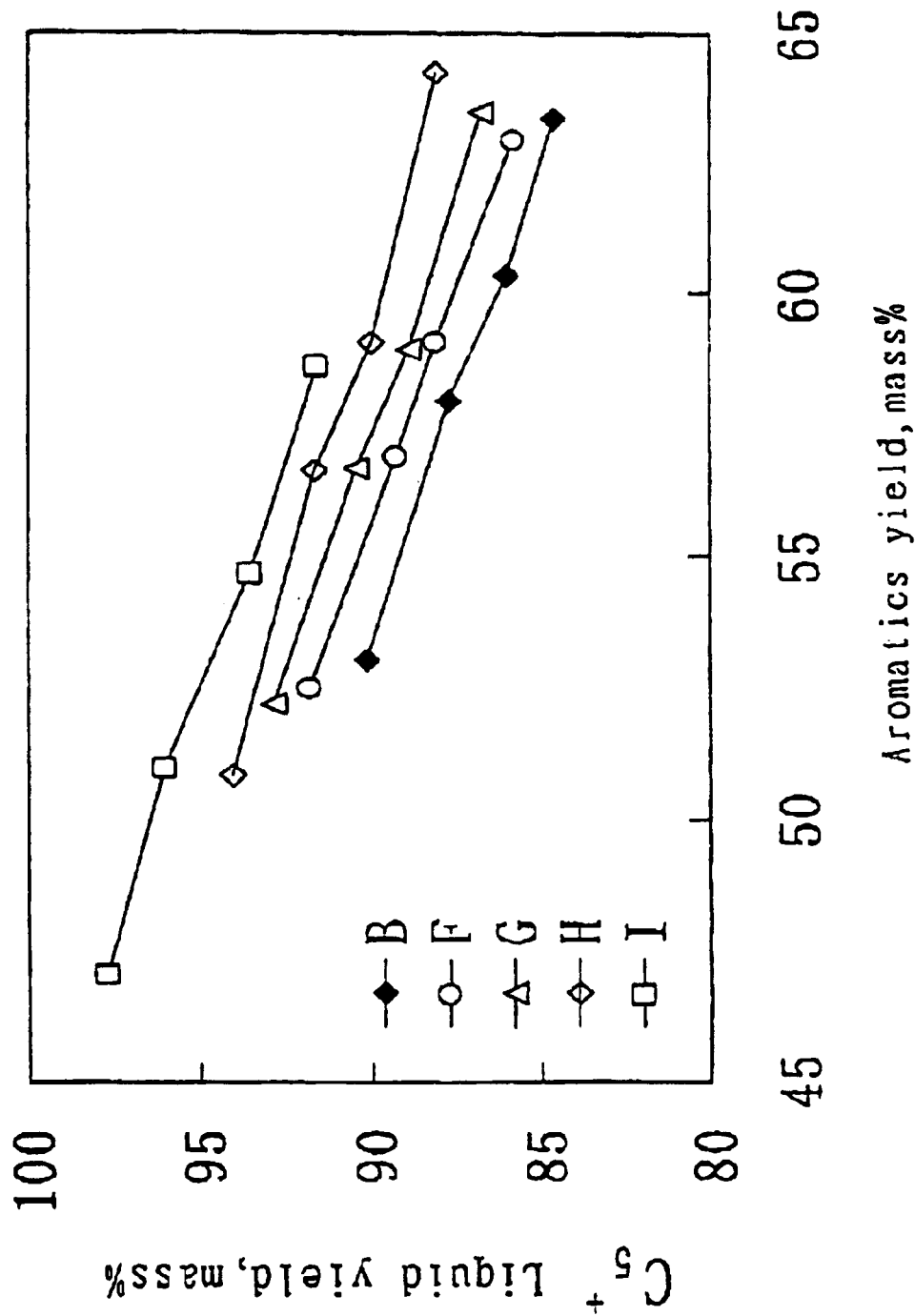

MULTIMETALLIC REFORMING CATALYST COMPRISING PLATINUM AND TIN, THE PREPARATION AND THE APPLICATION THEREOF

The present invention relates to a multimetallic hydrocarbons conversion catalyst which has the dual-functions of acidity and hydrogenation-dehydrogenation, and the preparation process thereof. In particular, the present invention relates to a multimetallic reforming catalyst comprising platinum and tin and the preparation process thereof.

Catalytic reforming is one of the most important technologies in the petroleum processing, and the main object thereof is to produce gasoline with high octane number, aromatics with wide applications, and hydrogen with low price. At present, the reforming catalysts widely used in industry are mostly bimetallic reforming catalysts such as Pt—Re, Pt—Sn catalysts. It is shown by research that, compared with Pt—Re catalysts, Pt—Sn catalysts have better low pressure stability, and higher aromatics selectivity, have no necessity to be pre-sulfurized, and are more appropriate for moving bed reforming process. The acidity function in the bimetallic catalysts for isomerization is generally provided by porous acidic oxide supports such as alumina and halogens, and the hydrogenation-dehydrogenation function is generally provided by Group VIII metal components such as platinum or palladium. The incorporation of the second metal component, Re or Sn, can greatly improve the stability of the catalyst and reduce the content of the noble metal, platinum.

Several competing reactions take place during the catalytic reforming procedure. These reactions include dehydrogenation of cyclohexanes to aromatics, dehydroisomerization of alkylcyclopentanes to aromatics, dehydrocyclization of acyclic hydrocarbons to aromatics, hydrocracking of paraffins to lighter hydrocarbons less than $C_5$, dealkylation of alkylbenzenes, and isomerization of paraffins. In these reactions, the yield of gasoline would decrease due to the formation of light paraffin gases from hydrocracking; the coking reaction would increase the deactivation rate of the catalyst; and the frequent regeneration of the catalyst would increase the operating cost. Therefore, it is always the object of persons skilled in the art to develop a reforming catalyst and process with high selectivity and low carbon deposit rate, wherein the addition of the third or the forth metal component into the bimetallic catalyst is one of the widely used modifying means in the art.

U.S. Pat. No. 3,915,845 discloses a multimetallic catalyst composition for hydrocarbon conversion, comprising 0.01–2.0 wt % of a Pt Group metal, 0.01–5.0 wt % of Germanium, 0.1–3.5 wt % of a halogen and a lanthanide compound, wherein the atomic ratio of lanthanide element/Platinum Group metal is 0.1–1.25. In the catalyst, the Pt Group metal is present as elemental metal state, while the other metals are present as oxide state. The lanthanide elements used are lanthanum, cerium or neodymium.

U.S. Pat. No. 4,039,477 discloses a hydrotreatment catalyst modified with lanthanide metals and the use thereof. Said catalyst comprises a refractory metal oxide, a Pt Group metal, Sn and at least one metal selected from the group consisting of Y, Th, U, Pr, Ce, La, Nd, Sm, Dy and Gd. This patent improves the activity stability of the catalyst by incorporating lanthanide metals into the catalyst and improves the selectivity of the lanthanide-containing catalyst by suppression of the cracking activity due to the presence of tin. In a specific embodiment, the $C_5^+$ yield in the conversion of hexanes on a Pt—Sn—Ce containing catalyst with a Ce/Pt weight ratio of 0.37 is greater than that of a Pt—Sn containing catalyst.

U.S. Pat. No. 6,059,960 discloses a Pt—Sn multimetallic reforming catalyst containing lanthanide series, wherein the incorporated lanthanide components are Eu, Yb, Sm, or a mixture of Eu and Yb, and more than 50% of the lanthanide metals in the catalyst is a present as EuO. When the composition of the catalyst is Pt—Sn—Eu, the relative activity and selectivity are better when the atomic ratio of Eu/Pt is between 1.3 and 2.0. The selectivity of the catalyst will be lowered when said ratio is less than 1.3. The activity of the catalyst will be greatly lowered when the atomic ratio of Eu/Pt is higher than 2.0.

It is an object of the present invention to provide a lanthanide-modified Pt—Sn reforming catalyst with high activity, high selectivity and good activity stability.

It is another object of the present invention to provide a process for preparing the catalyst described above.

The inventors have found that the bimetallic reforming catalyst modified by cerium and europium can improve the selectivity and anti-carbon depositing ability of the catalyst, and thereby increase the liquid yield of the reforming reaction and prolong the lifetime of the catalyst. In particular, the multimetallic catalyst according to the present invention comprises the following components on the basis of mass percents:

| | |
|---|---|
| Group VIII metal | 0.01–2.0 |
| Group IVA metal | 0.01–5.0 |
| Eu | 0.01–10.0 |
| Ce | 0.01–10.0 |
| Halogen | 0.10–10.0 |
| Refractory inorganic oxide | 63.00–99.86. |

Said Group VIII metal is selected from the group consisting of Pt, Pd, to Ru, Rb, Ir, Os or the mixtures thereof, with Pt being preferred. The Group VIII metal component is the major active component of the catalyst according to the present invention. The state of the Pt Group metal present in the catalyst may be an elemental metal or a compound, such as the oxide, sulfide, halide, or oxyhalide, etc., or a chemical combination with one or more other components in the catalyst. The preferred content of the Group VIII metal in the catalyst is 0.05–1.0 mass % on the basis of the elemental metal.

The Group IVA metal in the catalyst is preferably Ge or Sn, more preferably Sn. This metal component may be present as an elemental metal, or as a compound, such as the oxide, sulfide, halide, or oxyhalide, etc., or as a physical or chemical combination with other components of the support and the catalyst. The Group IVA metals preferably are present as an oxide state in the catalyst product. On the basis of elemental metal, the preferred content of the Group IVA metals in the catalyst according to the present invention is 0.1–2.0 mass %.

The lanthanide metals contained in the catalyst according to the present invention are a mixture of Ce and Eu. In the catalyst, Ce and Eu may be present as a compound, such as an oxide, hydroxide, halide, oxyhalide, or aluminate, or as a chemical combination with one or more other components in the catalyst. Each content of Ce and Eu in the catalyst preferably is 0.05–2.0 mass % on the basis of elemental metal, and more preferably 0.1–1.0 mass %. The atomic ratio of Eu/Pt in the catalyst according to the present invention is 0.2–3.0:1, preferably 0.2–1.0:1, more preferably 0.5–1.0:1, and the atomic ratio of Ce/Pt is 0.2–5.0:1, preferably 0.5–3.0:1. More than 60% of Ce in the reduced catalyst is present as the +3 valence.

The component used for adjusting the acid amount in the catalyst according to the present invention is a halogen, preferably chlorine. The content of the halogen in the catalyst is preferably 0.2–4.0 mass %.

Said catalyst support, which is generally a porous adsorptive material and has a specific surface area of 30–500 m²/g, is selected from refractory inorganic oxides. The porous support should have uniform composition 15 and is refractory under the operating conditions. The term "uniform composition" used herein means that the support is not layered and has no concentration gradient of the intrinsic components. If the support is a mixture of two or more refractory materials, these materials have a relative constant content or a uniform distribution throughout the whole support. The refractory inorganic oxides described in the present invention include:

(1) Refractory inorganic oxides, such as alumina, magnesia, chromia, boron oxide, titania, thoria, zinc oxide, zirconia, or the mixtures of the following two oxides: silica-alumina, silica-magnesia, chromia-alumina, alumina-boron oxide, silica-zirconia;

(2) Various ceramics, various alumine, and various bauxites;

(3) Silica, silicon carbide, various synthetic or natural silicates and clays. These silicates and clays may be treated with or without an acid.

In the present invention, the preferred inorganic oxide support is $Al_2O_3$, more preferred is the highly pure alumina prepared by the hydrolysis of aluminum alkoxide. The crystalline state of the alumina may be $\gamma$-$Al_2O_3$, $\eta$-$Al_2O_3$, or $\theta$-$Al_2O_3$, with $\gamma$-$Al_2O_3$ or $\eta$-$Al_2O_3$ being preferred. The more preferred crystalline state is $\gamma$-$Al_2O_3$. The alumina powder may be made into various forms such as sphere, sheet, granular, strip, or trefoil.

The aforesaid spherical support can be shaped by the oil-ammonia-drop method or hot oil-drop method. The strip or trefoil support can be prepared by the conventional extrusion shaping method.

The apparent bulk density of said refractory inorganic oxide is 0.4–1.0 g/ml, the mean pore diameter thereof is 20–300 Å, the pore volume thereof is 0.2–1.0 ml/g, and the specific surface area thereof is 100–500 m²/g.

The process for preparing the catalyst according to the present invention comprises separately incorporating the Group IVA metal, Eu, and Ce into the inorganic oxide support, then incorporating an element of the Group VIII metal, preferably Pt. Drying and calcining are needed after each metal component is incorporated.

In the preparation of the catalyst, the Group IVA metal, Eu and Ce should be firstly incorporated, and their incorporation order may be optional. The Group IVA metal may be incorporated firstly, and then Eu and Ce are incorporated, or vice versa. Eu and Ce can be incorporated simultaneously or separately. However, calcination is preferably carried out after each metal component has been incorporated to ensure a firm combination between the incorporated component and the support.

The Group IVA metal component may be incorporated into the catalyst by any means to attain a uniform distribution. Co-precipitation with the porous support, ion exchange, or impregnation may be used for incorporation. The impregnation is to impregnate the support with the solution of a soluble compound of the Group IVA metal and fill or disperse the solution throughout the whole porous carrier material. Suitable soluble compounds of the Group IVA metals are oxides, chlorides, nitrates, or alkoxides thereof such as stannous bromide, stannous chloride, stannic chloride, pentahydrate of stannic chloride; germanium dioxide, germanium tetraethoxide, germanium tetrachloride, lead nitrate, lead acetate, or lead chlorate. Stannic chloride, germanium tetrachloride, or lead chlorate are preferred, since a part of halogens can be incorporated by the above-mentioned chlorides together with the metal components. In addition, the Group IVA metal components can also be incorporated during the preparation of the support.

Cerium and europium in the catalyst can be incorporated in any suitable manner known to those skilled in the art, such as co-precipitation, co-gelation, co-extrusion with the porous support, or ion exchange with the gelled support, etc. The preferred way is to add corresponding hydrated oxides or oxyhalides of cerium and europium and carry out co-gelation or co-precipitation during the preparation of the support, and then dry and calcine the solid. The suitable lanthanum compounds which may form a soluble sol or dispersible sol are lanthanum trichloride or lanthanum oxide.

Another preferred method of incorporating cerium and europium involves utilization of a soluble compound of cerium and europium in solution to impregnate the porous support. The suitable solvents for formulating the impregnation solution comprise alcohols, ethers, acids, wherein inorganic acids such as HCl, $HNO_3$, and the like, organic acids such as oxalic acid, malonic acid, citric acid and the like are preferred. The soluble compounds used for impregnating the support are metal salts, compounds, or complexes of cerium and europium, such as nitrates, chlorides, fluorides, organic alkylates, hydroxides, oxides, wherein cerium nitrate, europium nitrate, cerium chloride, europium chloride, cerium oxide, or europium oxide are preferred. Eu and Ce can be incorporated into the support simultaneously or separately. The incorporation of Eu and Ce can be proceed either before, after, or during the incorporation of the Group VIII metal, preferably after the incorporation of the Group VIII metal.

The Group VIII metals in the catalyst are noble metals components, which can be incorporated into the support in any suitable manner, such as co-precipitation, ion exchange, or impregnation, etc. The preferred method involves the utilization of a soluble, decomposable compound of the Group VIII metals to impregnate the support. The unlimited examples of suitable water-soluble compounds or complexes of the Group VIII metals are: chloro-platinic acid, chloro-iridic acid, chloro-palladic acid, ammonium chloroplatinate, bromo-platinic acid, platinum trichloride, platinum tetrachloride hydrate, platinum dichloro-carbonyl dichloride, dinitrodiamino-platinum, sodium tetranitroplatinate(II), palladium chloride, palladium nitrate, palladium sulfate, diamminepalladium(II) hydroxide, tetramminepalladium chloride, hexamminepalladium chloride, rhodium carbonylchloride, rhodium trichloride hydrate, rhodium nitrate, sodium hexachlororhodate(III), sodium hexanitrorhodate(III), iridium tribromide, iridium dichloride, iridium tetrachloride, sodium hexanitroiridate (III), potassium chloroiridate or sodium chloroiridate, potassium rhodium oxalate. Chlorine-containing compounds of Pt, Ir, Rh, or Pd such as chloro-platinic acid, chloro-iridic acid, chloro-palladic acid, or rhodium trichloride hydrate are preferred. Hydrochloric acid or the like acids such as hydrofluoric acid can be added into the impregnation solution during the process of supporting platinum to facilitate the incorporation of the halogen and the uniform distribution of various metallic components throughout the carrier material. In addition, it is generally preferred to calcined the support after the support has been impregnated with the Group VIII metal in order to minimize the risk of washing away the Group VIII metals in other impregnation steps. The preferred way is to incorporate the Group VIII metal after incorporating other metal components, thus minimizing the loss of the Group VIII metal in other impregnation steps. Generally, the Group VIII metal is uniformly dispersed in the catalyst, or dispersed in the fashion that their concentration gradually decreased from the surface to the center of the catalyst grain.

In each step of the above operation for incorporating the metal component, drying and calcining are necessary after the incorporation of each metal component. The temperature of drying is 25–300° C., and the temperature of calcining is 370–700° C., preferably 550–650° C. Said calcination is generally carried out in an oxygen-containing atmosphere, and the preferred calcination atmosphere is air. The basis for determining the time of calcination is such that most of the metal components in the catalyst are converted to the corresponding oxides. The time of calcination varies with the change of the oxidation temperature and the oxygen content, and it is preferably 0.5–10 hr.

The catalyst according to the present invention can also contain other components or mixtures thereof, which act alone or are combined as catalyst modifiers to improve the activity, selectivity or stability of the catalyst. Said catalyst modifiers include Rh, In, Co, Ni, Fe, W, Mo, Cr, Bi, Sb, Zn, Cd or Cu. These components can be incorporated in any suitable manner into the carrier material during or after the preparation process thereof, or before, after, or during the incorporation of the other components of the catalyst according to the present invention. The content of said modifier is 0.05–5.0 mass %.

The catalyst according to the present invention can also contain alkali or alkali-earth metals, which can be incorporated into the catalyst in any known manner. However, the preferable method is to impregnate the support with an aqueous solution of a water-soluble) decomposable compound of the alkali or alkali-earth metal. Said alkali metals are Cs, Rb, K, Na, or Li, and said alkali-earth metals are Ca, Sr, Ba, or Mg, the content of which is 0.05–5.0 mass %.

The preparation process also comprises a halogen adjustment step to ensure a suitable acidity of the catalyst. The compounds used for incorporating halogens are preferably chlorine, HCl, or an organic compound which can be decomposed to produce chlorine such as dichloromethane, trichloromethane, tetrachloromethane. The temperature of the halogen adjustment is 370–700° C., and the time thereof is 0.5–5.0 hr or more. During this procedure, suitable amount of water is required, and the mole ratio of water to HCl is 1.0–150:1. The halogen adjustment step may take place during, or before, or after the calcination of the catalyst. The content of halogen in the final catalyst product is preferably 0.2–4.0 mass %.

It is necessary to employ a reduction step before the use of the catalyst according to the present invention in order to reduce the Group VIII metal component to the corresponding elemental metallic state and to ensure that they are uniformly distributed throughout the refractory inorganic oxide support. The reduction step should be taken place in a substantially water-free environment, e.g., the water content in the reducing gas should be less than 20 ppm. The preferred reducing gas is hydrogen, but other reducing gases such as CO and the like may also be used. The reduction temperature is 315–650° C., and the preferred reduction time is 0.5–10.0 hr. The reduction step can be taken place before the catalyst is charged into the reactor, or taken place in situ before the beginning of the reforming reaction.

The catalyst according to the present invention is appropriate for the catalytic reforming of naphtha to increase the octane number of gasoline and the yield of aromatics. Said naphtha is rich in naphthenes and paraffins and selected from full-boiling gasoline having an initial ASTM D-86 boiling point of 40–80° C. and an end boiling point of 160–220° C., a light gasoline with a boiling range of 60–150° C., or a heavy naphtha with a boiling range of 100–200° C. Suitable reforming feedstocks are straight run gasoline, partially reformed naphthas, or dehydrogenated naphthas, thermally or catalytically cracked gasoline fraction, and synthetic gasoline.

When the catalyst according to the present invention is used in the catalytic reforming, the absolute pressure is 100 KPa-7 MPa, preferably 350–2500 KPa; the temperature is 315–600° C., preferably 425–565° C.; the molar ratio of hydrogen/hydrocarbon is 1–20, preferably 2–10; the liquid hourly space velocity (LHSV) is 0.1–10 hr$^{-1}$, preferably 1–5 hr$^{-1}$.

The reforming process must be carried out under a substantially water-free environment. The water content in the feedstock entering into the conversion zone should be less than 50 ppm, preferably less than 20 ppm. The water in the reforming feedstock may be removed by using the conventional adsorbents such as molecular sieves, or be adjusted by suitable stripping operations in a fractionation unit. The water in the feedstock can also be removed by the combination of adsorbent drying and stripping operation. The water content in the hydrogen stream entering into the hydrocarbon conversion zone is preferably 10–20 ppm or less.

The catalyst according to the present invention is also suitable for other hydrocarbon conversion reactions, such as dehydrogenation, hydrogenation, hydrocracking, hydrogenolysis, isomerization, desulfurization, cyclization, alkylation, cracking, and hydroisomerization of hydrocarbon feedstocks.

The catalyst according to the present invention is preferably used in a sulfur-free environment. The desulfurization of the naphtha feedstock can be carried out by any conventional process, such as adsorption desulfurization, catalytic desulfurization, etc. Adsorption desulfurization processes may employ molecular sieves, crystalline aluminosilicates, high surface area $SiO_2$—$Al_2O_3$, activated carbon, high surface area metal-containing compounds such as high surface area compounds containing Ni, or Cu and the like. Conventional processes such as hydrorefining, hydrotreating, or hydrodesulfurization and the like can be used for catalytic desulfurization.

Figure 2:
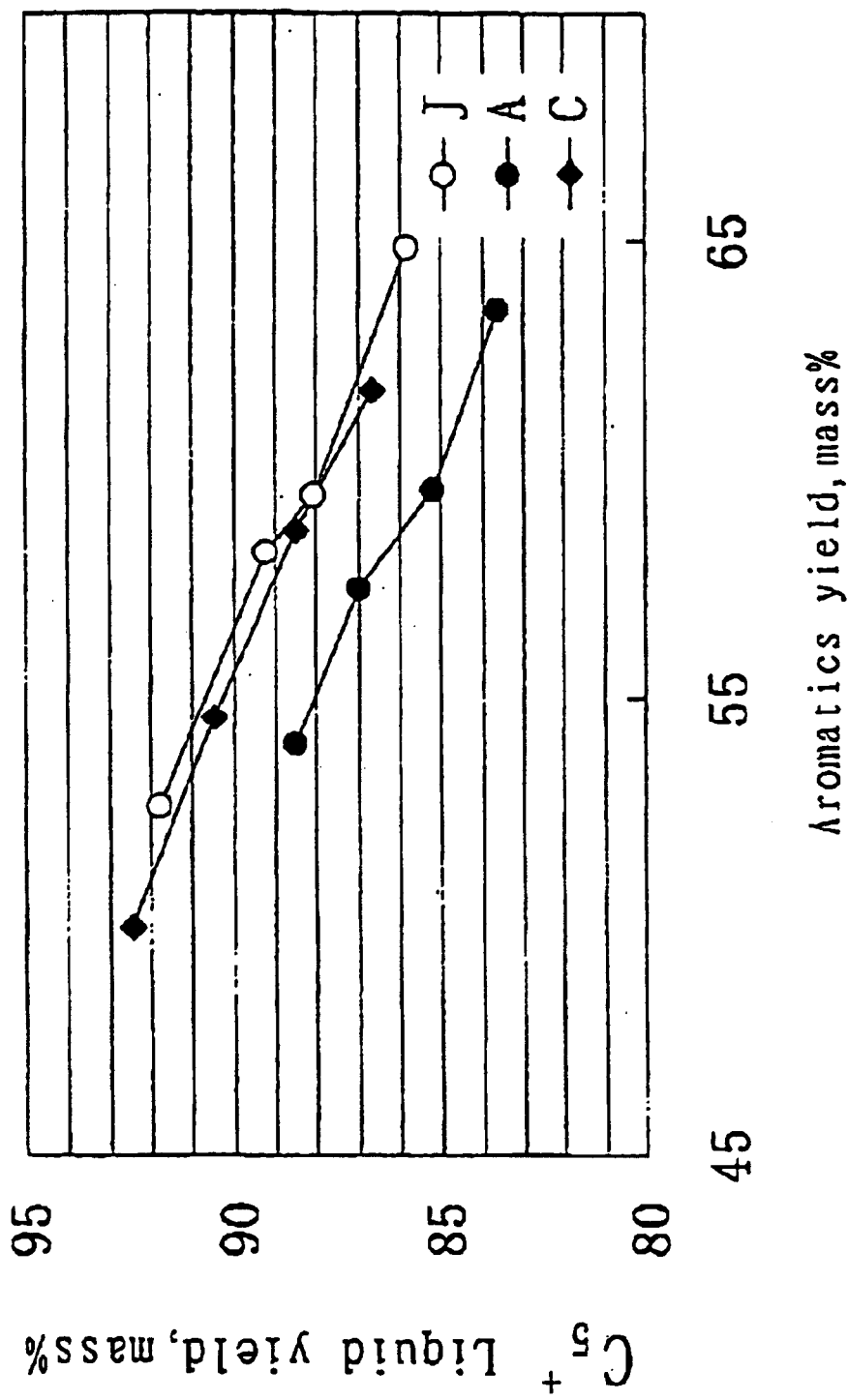
Figure 3:
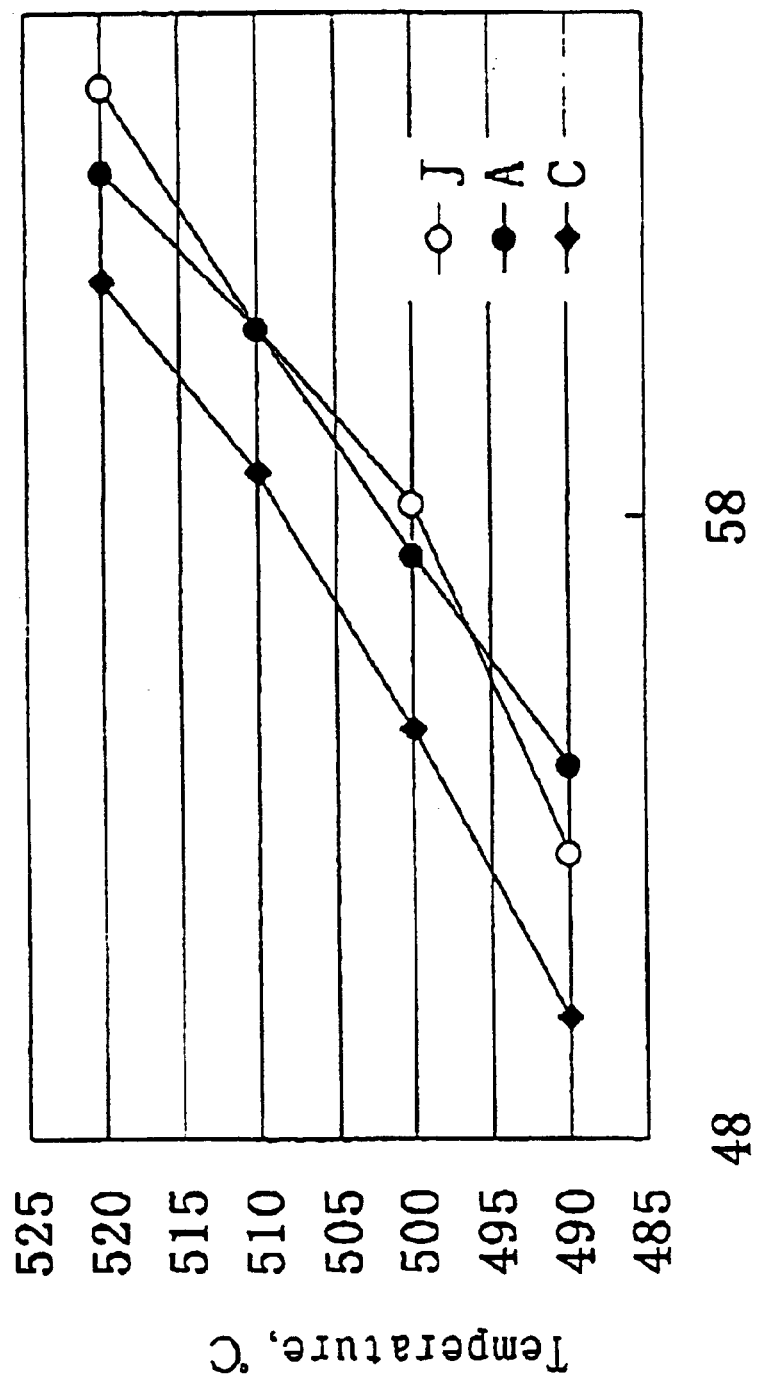
Figure 4:
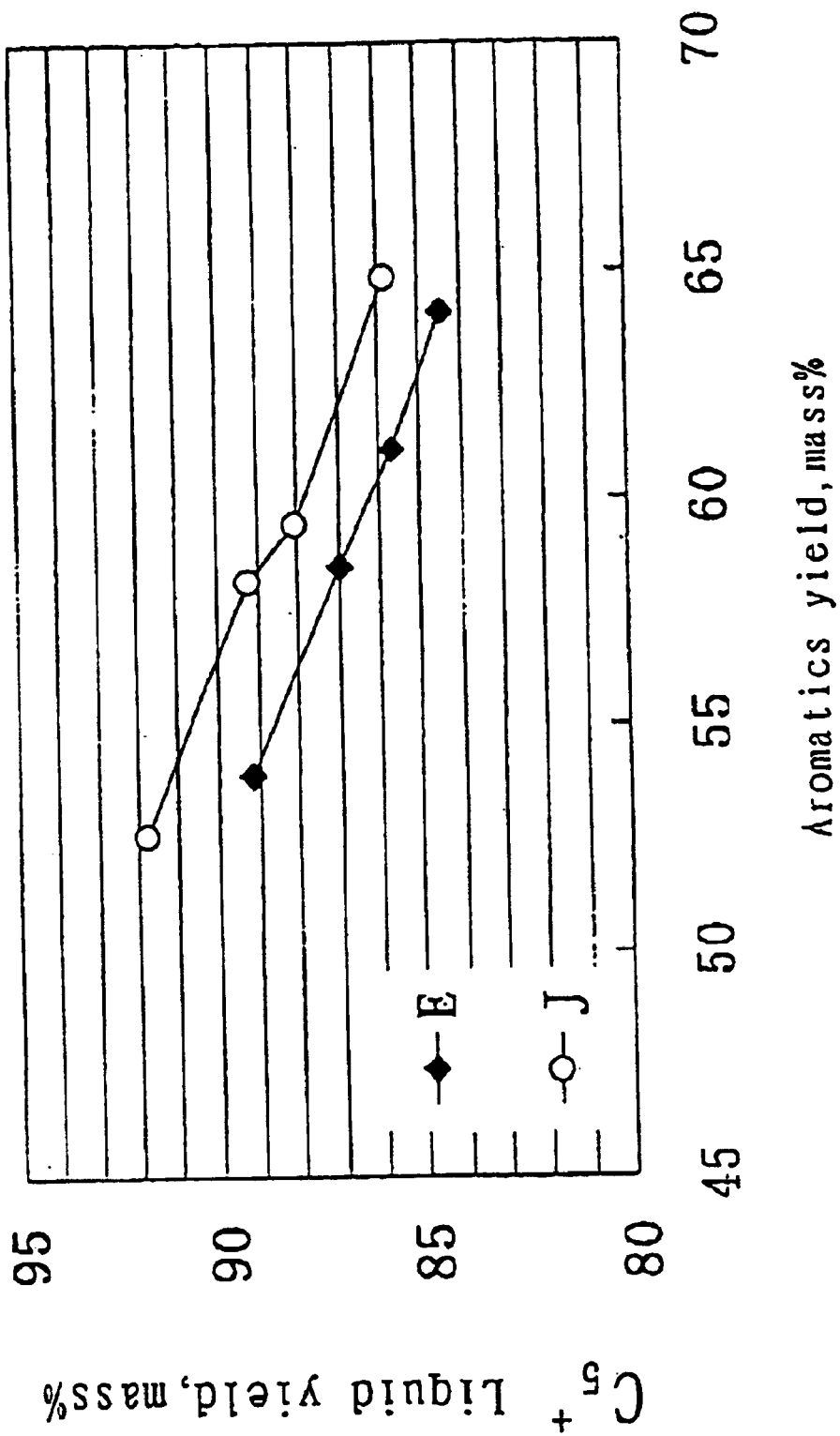
Figure 5:
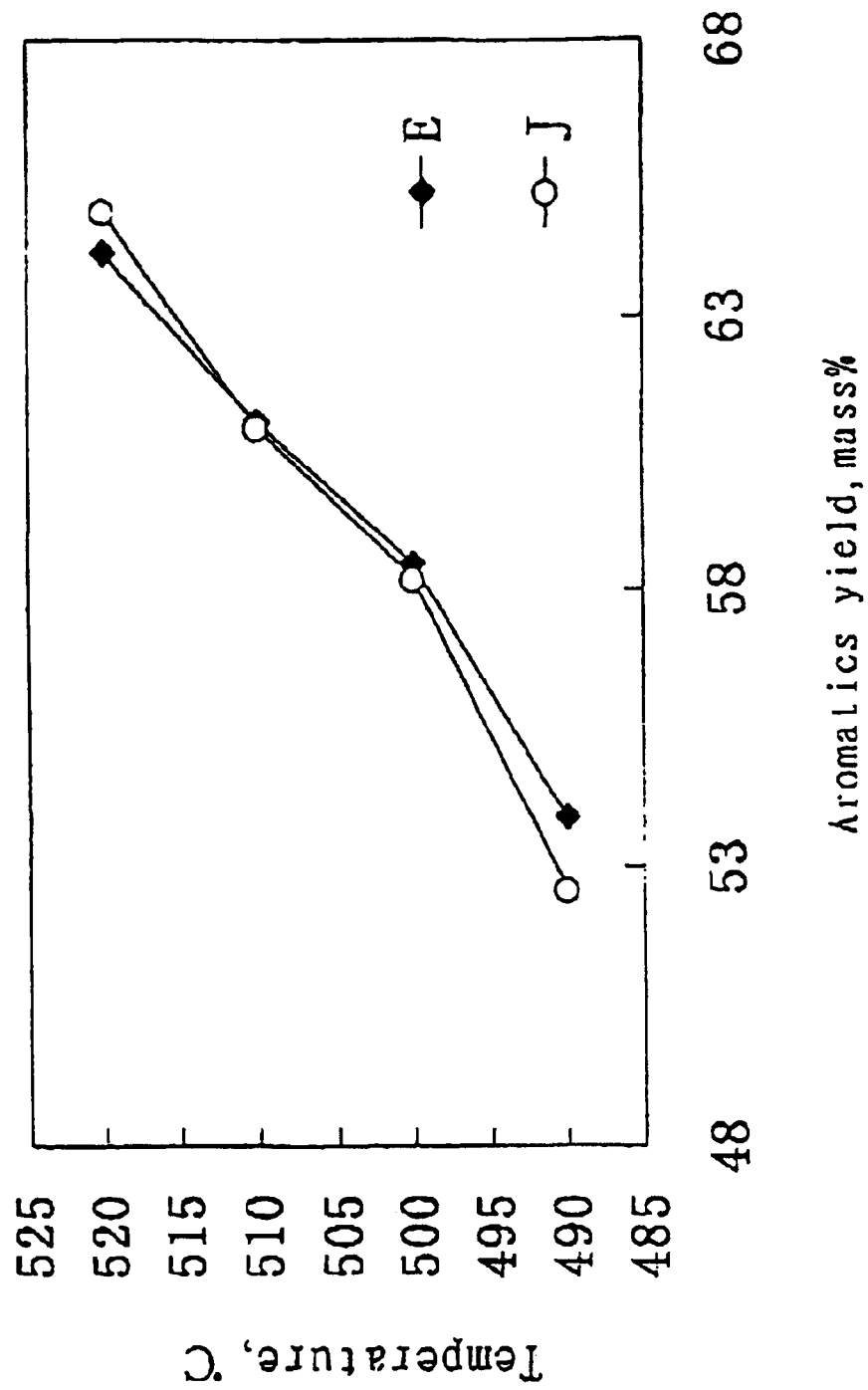
Figure 6:
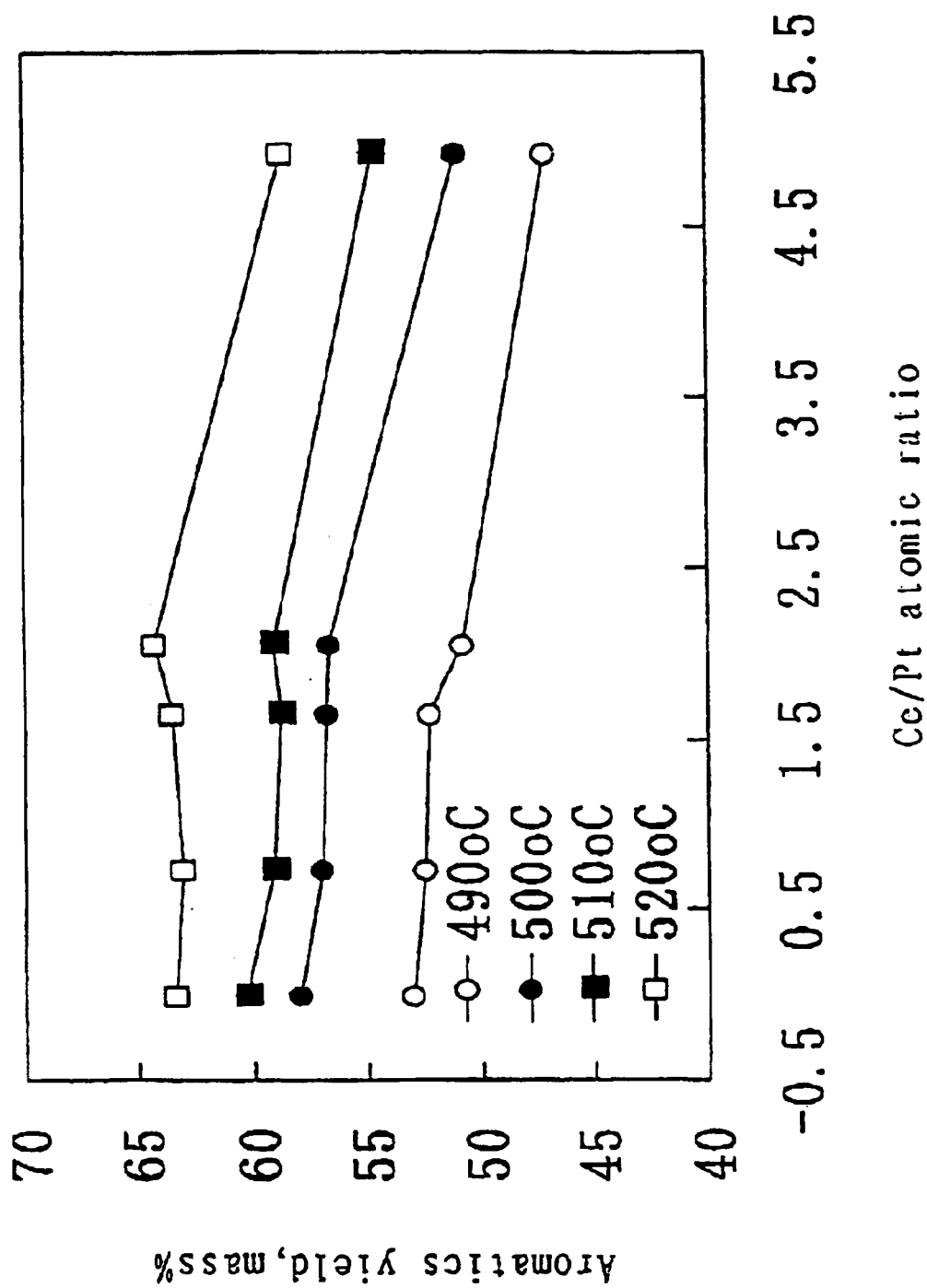

FIG. 1 is the diagram of selectivities of the catalysts according to the present invention versus that of Eu-containing Comparative Catalyst B FIG. 2 is the diagram of selectivities of the catalysts according to the present invention versus those of Eu-containing Comparative Catalysts A and C FIG. 3 is the diagram of activities of the catalysts according to the present invention versus those of Eu-containing Comparative catalysts A and C FIG. 4 is the diagram of selectivities of the catalysts according to the present invention versus that of the Ce-containing catalyst FIG. 5 is the diagram of activities of the catalysts according to the present invention versus those of Ce-containing catalyst FIG. 6 is the diagram of relationship between the atomic ratio of Ce/Pt in the catalysts according to the present invention and the yield of aromatics The selectivity and activity stability of the catalyst according to the present invention are improved owing to the simultaneous modification of the bimetallic catalyst by using cerium and europium. Compared with the catalyst modified solely with cerium or europium separately, the catalyst according to the present invention has higher liquid yield and greatly reduced carbon deposition rate under the same reaction conditions and aromatics yield.

The present invention will be described in detail by the following examples, but is not limited thereto.

EXAMPLE 1

Preparation of the Spherical Catalyst of the Present Invention.

(1) Preparation of the Sn-Containing $Al_2O_3$ support.

According to the process of Example 1 of CN 1150169A, 100 g SB aluminum hydroxide powder (produced by Condea Chemie GmbH, Germany) and the suitable amount of deionized water were stirred to a slurry with a liquid/solid weight ratio of 2.0. 7.5 ml dilute nitric acid (with a volume ratio of 1:1), 30 g urea, and a predetermined amount of solution of stannous chloride in hydrochloric acid were added so that the Sn content in the solution is 0.30 mass % on the basis of the dry alumina. The resultant content was stirred for 1 hr, and 30 g kerosene, 3 g fatty alcohol polyoxyethylene ether were added and stirred for another 1 hr, and then were formed into spheres in an oil-ammonia column by dropping. The wet spheres were solidified in ammonia water for 1 hr, then filtered, washed with deionized water for 2–3 times, dried at 60° C. for 6 hr, 120° C. for 10 hr, and calcined at 600° C. for 4 hr to yield Sn-containing support (a).

(2) Incorporation of Europium 100 g spherical support (a) was added into 180 ml solution of europium nitrate in nitric acid with a concentration of 2.27 mass %. The liquid/solid ratio in the impregnation is 1.8. After impregnating for 24 hr, the mixture was filtered, and the resultant solid was dried at 60° C. for 6 hr, 120° C. for 10 hr, then calcined in air containing 2–3% steam at 600° C. for 4 hr to yield the support containing Sn and Eu.

(3) Incorporation of Cerium

The Sn- and Eu-containing support obtained in step (2) was impregnated for 24 hr with 180 ml solution of cerium nitrate with a concentration of 0.58% t %. The solution/solid ratio in impregnation is 1.8. The mixture was filtered, and the resultant solid was dried at 60° C. for 6 hr, 120° C. for 10 hr, then calcined in air containing 2–3% steam at 600° C. for 4 hr to yield the support containing Sn, Eu, and Ce (4) Incorporation of Platinum The support prepared in the previous step was impregnated with a mixed solution formulated with the predetermined amount of chloro-platinic acid, hydrochloric acid, and trichloacetic acid. The content of Pt in the mixed solution should be such that the resultant catalyst contains the required Pt content, and the amounts of hydrochloric acid and trichloroacetic acid are 1.2% and 5.0% respectively on the basis of the mass of alumina on dry base. The liquid/solid ratio of the mixed impregnation solution to the support is 1.8, and the impregnation time is 24 hr. The impregnated and filtered solid was activated at 510° C. for 6 hr in air at a water to HCl mole ratio of 60:1, and then reduced at 500° C. by pure hydrogen to yield catalyst F, the composition of catalyst F is shown in Table 1. The contents of Pt, Sn, Eu, and Ce were measured by means of the X-ray fluorescent spectrometry, and the content of chlorine was measured by the electrode method.

EXAMPLE 2

Catalyst G was prepared according to the procedure of Example 1, except that the concentration of the solution of cerium nitrate for incorporating cerium in step (3) was 1.42 mass %, the solid impregnated with europium and cerium in steps (2) and (3) was calcined in air at 650° C. for 6 hr. The composition of catalyst G after reduction with hydrogen is shown in Table 1.

EXAMPLE 3

Catalyst H was prepared according to the procedure of Example 1, except that the concentration of the solution of cerium nitrate for incorporating cerium in step (3) was 1.70 mass %, the platinum-impregnated and filtered solid was activated in air and under the conditions of 560° C. and a water to HCl mole ratio of 50:1 for 6 hr in step (4). The composition of catalyst H after reduction with hydrogen is shown in Table 1.

EXAMPLE 4

Catalyst I was prepared according to the procedure of Example 1, except that cerium was firstly incorporated into the Sn-containing support, europium was then incorporated thereto, and the concentration of the solution of cerium nitrate used in the Ce-impregnating step is 4.98 mass %. The composition of catalyst I after reduction with hydrogen is shown in Table 1.

EXAMPLE 5

The present example simultaneously incorporate europium and cerium into the support by using the co-impregnation method.

100 g Sn-containing support (a) prepared in Example 1 was simultaneously impregnated with 180 ml solution containing 1.70 mass % cerium nitrate and 0.62 mass % europium nitrate. The solid obtained by filtration was dried at 60° C. for 6 hr, 120° C. for 10 hr, then calined at 600° C. in air containing 2–3% steam for 4 hr, and then supported with Pt according to the procedure of step (4) in Example 1 to produce catalyst J, the composition of which is shown in Table 1.

EXAMPLE 6

Catalyst K was prepared according to the procedure of Example 1, except that the impregnation solutions used in steps (2) and (3) are 180 ml of 3.78 mass % solution of europium chloride and 1.29 mass % solution of cerium chloride respectively. The composition of catalyst K reduced by hydrogen is shown in Table 1.

COMPARATIVE EXAMPLE 1

Preparation of Spherical Catalyst A Containing Pt, Sn and Eu.

A catalyst was prepared according to the procedure of Example 1, except that cerium has not been incorporated into the support, and the impregnation solution for incorporating europium is 180 ml of 0.62 mass % solution of europium nitrate. The composition of the prepared catalyst A is shown in Table 1

COMPARATIVE EXAMPLE 2

A catalyst was prepared according to the procedure of Comparative Example 1, except that the impregnation solution for incorporating europium is 180 ml of 1.36 mass % solution of europium nitrate. The composition of the prepared catalyst B is shown in Table 1.

COMPARATIVE EXAMPLE 3

A catalyst was prepared according to the procedure of Comparative Example 1, except that the impregnation solution for incorporating europium is 180 ml of 2.31 mass % solution of europium nitrate. The composition of the prepared catalyst C is shown in Table 1.

COMPARATIVE EXAMPLE 4

Preparation of a Spherical Catalyst Containing Pt, Sn, and Ce.

A catalyst was prepared according to the procedure of Example 1, except that europium has not been incorporated into the support, and the impregnation solution for incorporating cerium is 180 ml of 1.70 mass % solution of cerium nitrate. The composition of the prepared catalyst E is shown in Table 1.

EXAMPLE 7

The present example demonstrates the valence of the lanthanide element in the catalyst of the present invention.

The hydrogen absorption spectrum of Catalysts F, G, H, I, J and Comparative Catalysts A, B were measured by the following method: a temperature-programmed reduction procedure was effected using 3 mol % $H_2$ in He, with ramping from room temperature to 800° C. at a rate of 8° C. per minute. The reduction peak below 600° C. was integrated for calculating hydrogen consumption. The result thereof is shown in Table 2.

As can be seen from Table 2, Catalysts F, G, H, I, J have increased hydrogen consumption as compared with Catalysts A and B which do not contain Ce. The increased hydrogen consumption indicates that more than 85% of Ce in the catalysts of the present invention are +3 valence.

EXAMPLE 8

The present example evaluates the selectivity of the catalysts of the present invention.

2 g catalyst was charged into a micro-reactor. A straight run naphtha of 86–151° C. was used as the feedstock, whose properties are shown in Table 3. The conditions for evaluation were: 0.70 MPa, the volume space velocity of the feedstock 2 $hr^{-1}$, the volume ratio of hydrogen/hydrocarbon 800:1. During the reaction, the reaction temperature was regulated at 490° C., 500° C. 510° C., and 520° C. respectively to alter the yield of aromatics. The evaluation results are shown in FIG. 1.

As can be seen from FIG. 1, in case of the same aromatics yield, catalysts F–I of the present invention have higher $C_5^+$ yield as compared with Comparative Catalyst B, showing that the selectivity of the catalysts of the present invention has been greatly improved as compared with Comparative Catalyst B which contains only europium.

EXAMPLE 9

Catalysts J of the present invention and Comparative Catalysts A and C were evaluated in a micro-reactor with the evaluation conditions and feedstock oil the same as those of Example 8. The results are shown in FIGS. 2 and 3.

FIG. 2 shows that in case of the same content of Eu, when same aromatics yield was achieved, the $C_5^+$ yield of Catalyst J is 2 m. % higher than that of Catalyst A. The $C_5^+$ liquid yield of Catalyst J is slightly higher than that of Catalyst C which has an increased content of Eu.

However, as can be seen from FIG. 3, in case of the same aromatic yield, the temperature needed for Catalyst C is 5–8° C. higher than that of Catalyst J, indicating that the activity of Catalyst C is significantly lower than that of Catalyst J.

EXAMPLE 10

Catalysts J of the present invention and Comparative Catalyst E were evaluated in a micro-reactor with the evaluation conditions and feedstock oil the same as those of Example 8. The results are shown in FIGS. 4 and 5.

FIG. 4 shows that in case of the same aromatic yield, the $C_5^+$ yield of Catalyst J is 2 m. % higher than that of Catalyst E when catalyst of the present invention was compared with Comparative Catalyst E which contains only Ce, indicating the selectivity of the present catalyst is higher than that of Comparative Catalyst. As can be seen from FIG. 5, in case of the same aromatic yield, the temperature needed for Catalyst E is same as that of Catalyst J, indicating that the activity of Catalyst E is comparable with that of Catalyst J.

EXAMPLE 11

The carbon deposition rate on the catalyst was evaluated according to RIPP107-90 method [see "Analytic Methods in Petrochemical Industry" (RIPP testing method), by Cuiding Yang et al.]. The instrument used for the evaluation is a CS-334 Model IR carbon/sulfur determinator made by LECO Company, USA. The results are shown in Table 4. The relative carbon deposition rate in Table 4 is calculated by the following formula:

$$\text{Relative carbon deposition rate \%} = \frac{\text{Carbon content in catalyst}}{\text{Carbon content in comparative catalyst}} \times 100\%$$

The comparative catalyst used for determination of the carbon deposition rate was the Pt—Sn catalyst prepared by steps (1) and (4) in Example 1, wherein the Pt content is 0.34 mass %, and the Sn content is 0.30 mass %.

As can be seen from Table 4, the carbon deposition rate of the catalyst of the present invention decrease somewhat as compared with catalysts A, B and C which contain only europium and catalyst E which contains only cerium, and with Ce and Eu contents in the catalyst increasing, the carbon deposition rate of the catalyst has a tendency of declining. In addition, in the case of the same content of lanthanide in the catalyst, the relative carbon deposition rate of the catalyst J of the present invention is lower than that of Comparative Catalyst C.

EXAMPLE 12

The present example evaluates the influence of the content of cerium in the present invention on the selectivity of the present catalyst.

Catalysts F, G, H, I, and Comparative Catalyst B were evaluated according to the procedure of Example 8. The results thereof are shown in FIG. 6.

As can be seen from FIG. 6 that when the Ce/Pt atomic ratio in the catalyst is less than 1.3, the yield of aromatics does not decrease significantly, on the contrary, the yield of aromatics rises somewhat when the temperature is higher than 500° C. However, when the atomic ratio of Ce/Pt in the catalyst is higher than 2.2, the yield of aromatics will decrease.

TABLE 1

| Example No. | Catalyst No. | Pt, m % | Sn, m % | Eu, m % | Ce, m % | Cl, m % |
|---|---|---|---|---|---|---|
| 1 | F | 0.33 | 0.30 | 0.33 | 0.18 | 1.15 |
| 2 | G | 0.33 | 0.30 | 0.33 | 0.39 | 1.12 |
| 3 | H | 0.33 | 0.30 | 0.33 | 0.49 | 0.97 |
| 4 | I | 0.33 | 0.30 | 0.33 | 1.17 | 1.20 |
| 5 | J | 0.33 | 0.30 | 0.15 | 0.48 | 1.15 |
| 6 | K | 0.34 | 0.30 | 0.49 | 0.48 | 1.16 |
| Comparative Example 1 | A | 0.33 | 0.30 | 0.15 | — | 1.18 |
| Comparative Example 2 | B | 0.33 | 0.30 | 0.33 | — | 1.15 |
| Comparative Example 3 | C | 0.33 | 0.30 | 0.56 | — | 1.15 |
| Comparative Example 4 | E | 0.33 | 0.30 | — | 0.48 | 1.25 |

TABLE 2

| Catalyst | A | J | B | F | G | H | I |
|---|---|---|---|---|---|---|---|
| hydrogen consumption, μmol/g | 66.7 | 83.3 | 72.2 | 78.3 | 86.0 | 89.2 | 108.8 |

TABLE 3

| | |
|---|---|
| Density (20° C.), kg/m³ | 727.4 |
| Distillation, ASTM D-86, ° C. IBP/50%/EP | 86/109/151 |
| Composition, mass % Paraffins/Naphthenes/Aromatics | 55.70/41.38/2.92 |
| Potential content of aromatics, mass % | 41.59 |

TABLE 4

| Catalyst No. | A | B | C | E | F | G | H | I | J | K |
|---|---|---|---|---|---|---|---|---|---|---|
| Relative carbon deposition rate, % | 0.80 | 0.80 | 0.73 | 0.80 | 0.70 | 0.65 | 0.58 | 0.40 | 0.64 | 0.53 |

What is claimed is:

1. A multimetallic reforming catalyst, which comprises the following components on the basis of mass percent:

| | |
|---|---|
| Group VIII metal | 0.01–2.0 |
| Group IVA metal | 0.01–2.0 |
| Eu | 0.01–10.0 |
| Ce | 0.01–10.0 |
| Halogen | 0.10–10.0 and |
| Refractory inorganic oxide | 63.00–99.86. |

2. The catalyst according to claim 1, wherein said catalyst comprises the following components on the basis of mass percent:

| | |
|---|---|
| Group VIII metal | 0.05–1.0 |
| Group IVA metal | 0.10–2.0 |
| Eu | 0.05–2.0 |
| Ce | 0.05–2.0 |
| Halogen | 0.20–4.0 and |
| Refractory inorganic oxide | 89.00–99.55. |

3. The catalyst according to claim 1 or 2, wherein more than 60% of Ce in the catalyst is present as the +3 valence.

4. The catalyst according to claim 3, wherein said refractory inorganic oxide is alumina.

5. The process according to claim 4, wherein said alumina is a highly pure alumina prepared by hydrolysis of aluminum alkoxide.

6. The catalyst according to claim 3, wherein said Group VIII metal is platinum, Group IVA metal is tin, and halogen is chlorine; the atomic ratio of Eu/Pt in the catalyst is 0.2–3.0:1, and the atomic ratio of Ce/Pt in the catalyst is 0.2–5.0:1.

7. The catalyst according to claim 6, wherein the atomic ratio of Eu/Pt in the catalyst is 0.5–1.0:1, and the atomic ratio of Ce/Pt of the catalyst is 0.5–3.0:1.

8. A process for preparing the catalyst according to claim 1, which comprises separately incorporating Group IV metal, Eu, and Ce into the inorganic oxide support; then incorporating a Group VIII metal; and drying and calcining each component after each incorporation.

9. The process according to claim 8, wherein said Group VIII metal is platinum.

10. The process according to claim 8, wherein Eu and Ce are simultaneously incorporated into the support by co-precipitation or co-impregnation during the preparation of the catalyst.

11. The process according to claim 8, wherein the halogen is incorporated by the water-chlorine adjustment method, in which the temperature is 370–700° C. and the mole ratio of water to HCl is 1.0–150:1.

* * * * *

UNITED STATES PATENT AND TRADEMARK OFFICE
CERTIFICATE OF CORRECTION

PATENT NO. : 6,780,814 B2
DATED : August 24, 2004
INVENTOR(S) : A. Ma et al.

It is certified that error appears in the above-identified patent and that said Letters Patent is hereby corrected as shown below:

Column 11,
Line 16, "Group IVA metal 0.01 - 2.0" should be -- Group IVA metal 0.01 - 5.0 --.

Signed and Sealed this

Seventeenth Day of May, 2005

JON W. DUDAS
*Director of the United States Patent and Trademark Office*